Oct. 7, 1952     D. A. KESTER     2,613,045
FISHING REEL
Filed July 15, 1949     2 SHEETS—SHEET 1
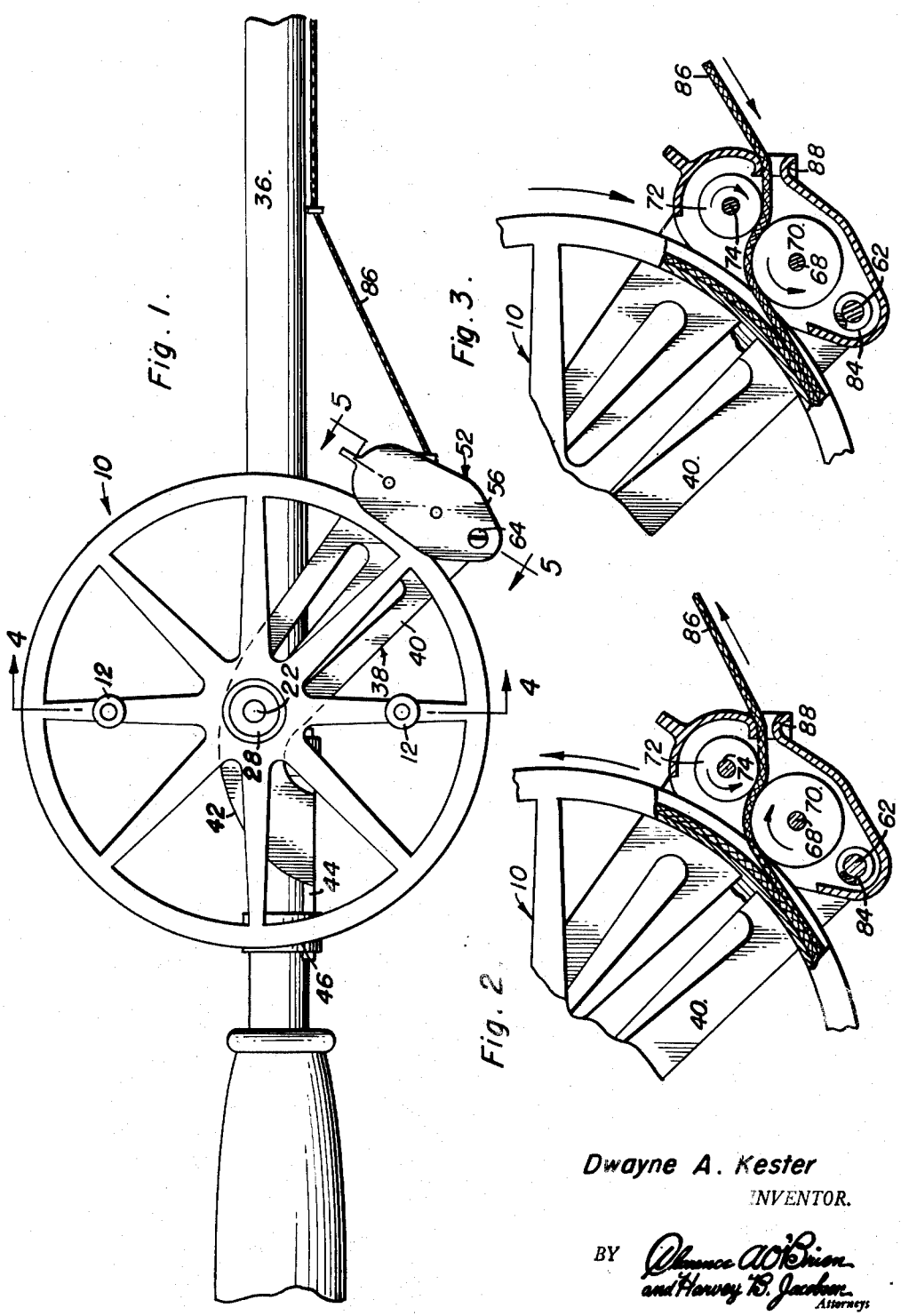
Dwayne A. Kester
INVENTOR.

Oct. 7, 1952   D. A. KESTER   2,613,045
FISHING REEL
Filed July 15, 1949   2 SHEETS—SHEET 2
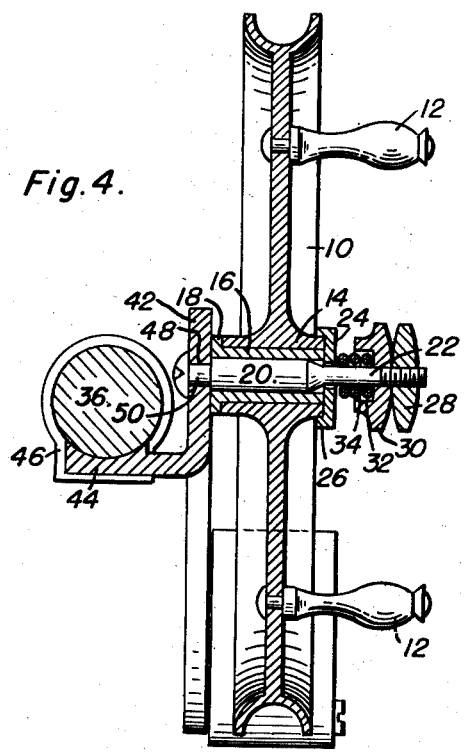
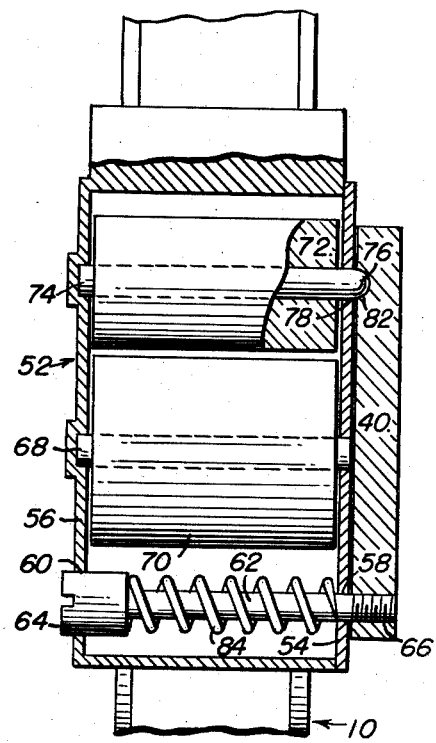
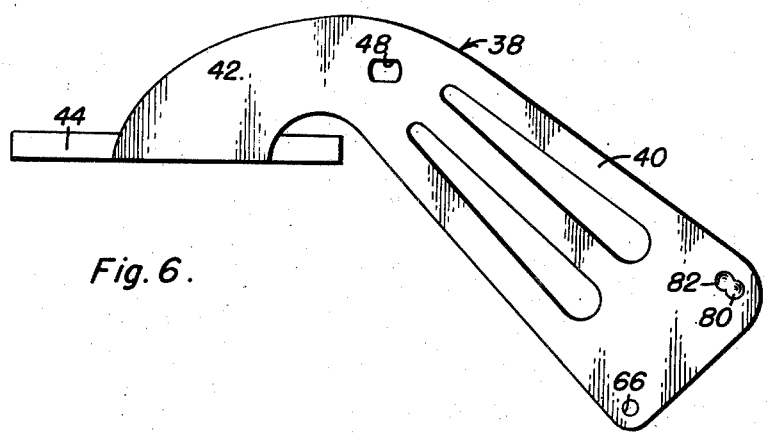
Dwayne A. Kester
INVENTOR.

Patented Oct. 7, 1952

2,613,045

UNITED STATES PATENT OFFICE 2,613,045

FISHING REEL

Dwayne A. Kester, Mansfield, Wash.

Application July 15, 1949, Serial No. 104,834

2 Claims. (Cl. 242—84.5)

1

This invention relates to new and useful improvements in fishing reels and the primary object of the present invention is to provide an attachment for fishing reels that will eliminate the back lashing of a fishing line as it is unwound from a fishing reel during casting.

Another important object of the present invention is to provide a fishing reel including a novel and improved guide mechanism that is maintained in a selected pivoted position during the winding and unwinding of a line to retain the line relatively taut.

A further object of the present invention is to provide a fishing reel including a back lash remover that constitutes a means whereby the reel may be quickly and readily applied to or removed from a fishing pole in a convenient manner.

A still further aim of the present invention is to provide a fishing reel and a back lash remover therefor that is simple and practical in construction, strong and reliable in use, neat and attractive in appearance, small and compact in structure, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a fragmentary side elevational view of a fishing pole and showing the present invention applied thereto;

Figure 2 is a fragmentary side elevational view of the present invention set-up for use in casting a line, and with parts broken away for the convenience of explanation;

Figure 3 is a view similar to Figure 2 and showing the present invention set-up for rewinding the line;

Figure 4 is an enlarged vertical sectional view taken substantially on the plane of section line 4—4 of Figure 1;

Figure 5 is an enlarged sectional view taken substantially on the plane of section line 5—5 of Figure 1; and, Figure 6 is a side elevational view of the attaching frame that forms a part of the present invention.

Referring now to the drawings in detail, wherein for the purpose of illustration, there is disclosed a preferred embodiment of the present invention, the numeral 10 represents a line holder having hand grips 12 whereby the holder may be rotated for winding a line thereon. The holder 10 is provided with a hub portion 14 that receives a bearing sleeve 16 having an end flange 18.

The sleeve 16 receives a supporting shaft 20 having a reduced end portion 22 that enters a central opening in retaining and braking cap 24. The cap 24 includes a flanged portion 26 that embraces one end of the hub portion 14. The end portion 22 is threaded to receivably engage a finger gripping knob or abutment 28.

A holding disk 30 received on the end portion 22 is provided with a recess 32 in its inner face that receives one end of a coil spring 34. The coil spring 34 embraces the end portion 22 and will urge the flange 18 and cap 24 against the hub portion 14, to brake the rotation of the holder on the sleeve 16 as the abutment 28 is manually adjusted on the end portion 22 toward the cap 24.

Means is provided for attaching the holder 10 to a fishing rod or pole 36 and this means consists of a frame 38 having an elongated and flat portion 40. The portion 40 terminates in an arcuate extension 42 having a perpendicular extension 44, the latter being secured to the pole 36 by holding clamps 46.

The portion 40 includes a substantially rectangular slot 48 that receives the squared end portion 50 of the shaft to hold the shaft against rotation relative to the frame 38. The outer extremity of the end portion 50 is flattened to hold the shaft on the frame.

The numeral 52 represents a casing having inner and outer spaced side walls 54 and 56 that are formed with opposed openings 58 and 60 respectively, that receive the shank 62 and head portion 64 of a pivot pin or bolt. The shank 62 is threaded and receivably engages a threaded opening 66 in the portion 40 of the frame 38 so that the casing can rotate or pivot with respect to the frame for a purpose which will later be more fully apparent.

The ends of a first axle 68 are journaled for rotation in suitable recesses or bearings on the walls 54 and 56. The axle 68 supports a first roller 70 that is spaced parallel to a second roller 72 also mounted in the casing 52. The roller 72 is supported on a second axle 74 having inner and outer end portions. The outer end portion of the axle 74 is journaled for rotation in a recess or bearing in the wall 56 whereas the inner end portion 76 of the axle 74 extends through an opening 78 in the wall 54 to selectively enter a first recess 80 or second recess 82 in the portion 40 to retain the casing in a selected pivoted position.

Means is provided for locking the casing 52 in a selected pivoted position with the end portion 76 in either the recess 80 or 82. This means comprises a coil spring 84 that embraces the shank 62 and which is biased between the head portion 64 and the inner wall 54. By adjusting the fastener or pivot pin 62, 64 the spring will yieldingly retain or lock the end portion 76 in one of the recesses 80, 82.

During casting, or unwinding of the line 86 from the holder 10, the end portion 76 will be received in the recess 82 with the roller 72 disposed relatively close to the reel or holder 10 and the roller 70 will contact the reel, as shown in Figure 2. However, when the line 86 is to be wound upon the holder 10 the end portion 76 is received in the recess 80 to retain the roller 72 spaced from the holder 10 as shown in Figure 3.

In practical use of the present invention for casting, the line 86 is extended from the holder 10, trained through and between the rollers 70 and 72, and passes through a guide sleeve 88 forming a part of the casing 52. The end portion 76 of the axle 74 is placed in the recess 82. The line 86 is cast and, since the roller 70 contacts the spool of the holder 10, the rollers 70 and 72 will rotate in the direction of the arrows in Fig. 2 to impart a forward movement to the line and hold the line relatively taut thereby preventing back lashing of the line. When the line 86 is to be rewound on the holder 10, the end portion 76 of the axle 74 is placed in the recess 80 with the roller 72 spaced a greater distance from the holder 10 than when line is to be removed from the holder. As the holder is rotated the rollers 70 and 72 will rotate in opposite directions, as shown in Figure 3, as a result of the line contacting the said rollers, to maintain the line taut as it is wound on the holder.

Having described the invention, what is claimed as new is:

1. A fishing reel comprising a rotatable line holder, a frame attached to the line holder and constituting a means for attaching the holder to a pole, a casing pivotally mounted on said frame, a guide sleeve carried by said casing, a line wound on said holder and extending through said guide sleeve, a pair of rollers mounted within said casing for rotation, said rollers being spaced to receive said line and adapted to rotate as the line is pulled through the guide sleeve, means for holding the casing in a selected pivoted position, and means for locking the casing in a selected pivoted position, said means for holding said casing in a selected pivoted position including a supporting axle for one of said rollers having an outwardly projecting end portion, said frame having a plurality of recesses therein for selectively receiving the outwardly projecting end portion of said axle.

2. A fishing reel comprising a rotatable line holder, a frame attached to the line holder and constituting a means for attaching the holder to a pole, a casing pivotally mounted on said frame, a guide sleeve carried by said casing, a line wound on said holder and extending through said guide sleeve, a pair of rollers mounted within said casing for rotation, said rollers being spaced to receive said line and adapted to rotate as the line is pulled through the guide sleeve, means for holding the casing against pivotal movement with one of the rollers in driving contact with the holder, and means for locking the casing with the said one roller in driving contact with the holder, said means for locking said casing against pivotal movement including a pivot pin threaded to said frame and pivotally supporting the casing, and a spring carried by said pivot pin and yieldingly bearing against said casing, said pivot pin being adjustable to compress the spring.

DWAYNE A. KESTER.

REFERENCES CITED

The following references are of record in the file of this patent:

UNITED STATES PATENTS

| Number | Name | Date |
|---|---|---|
| 2,051,259 | James | Aug. 18, 1936 |
| 2,197,675 | Babcock | Apr. 16, 1940 |
| 2,506,354 | Green | May 2, 1950 |

FOREIGN PATENTS

| Number | Country | Date |
|---|---|---|
| 819,966 | France | July 19, 1937 |